No. 747,573.

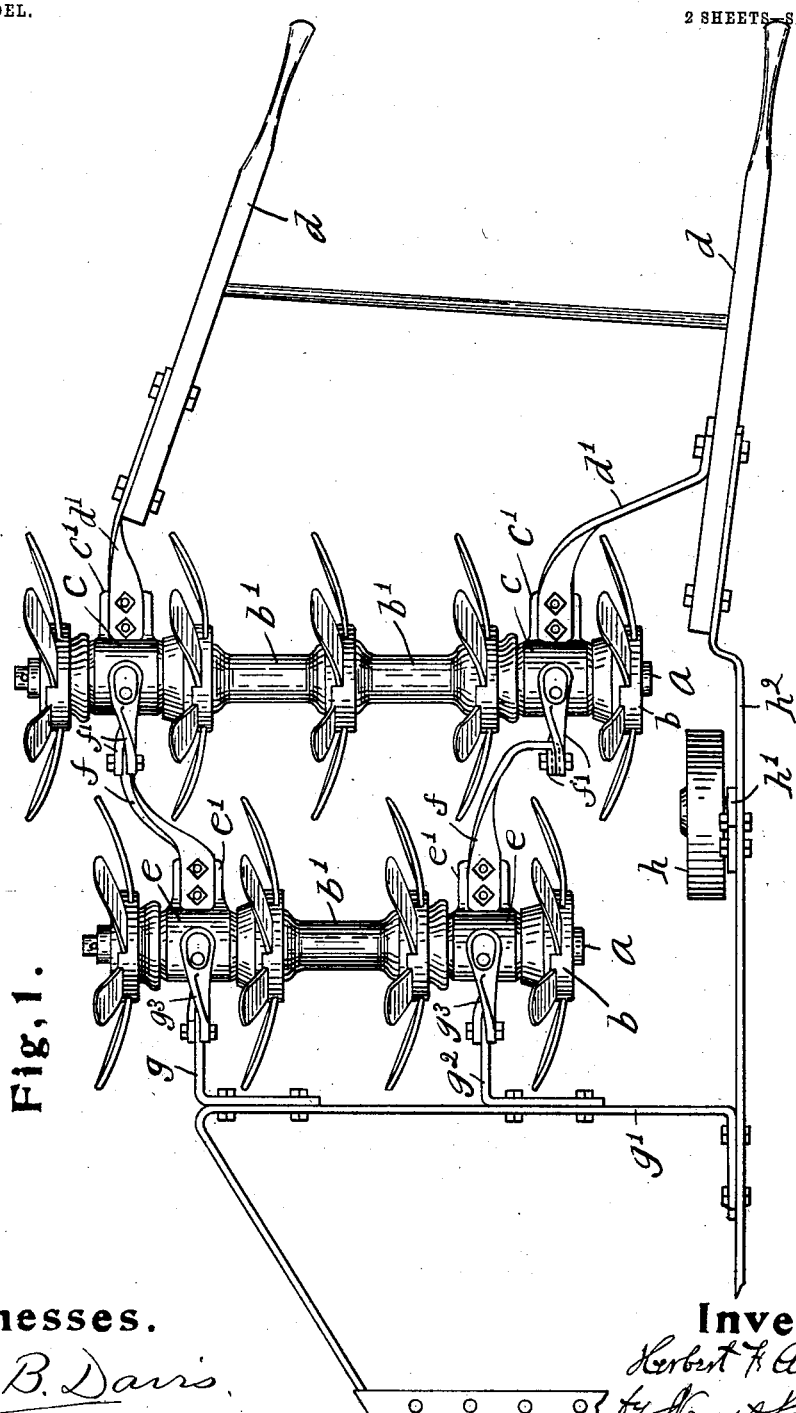

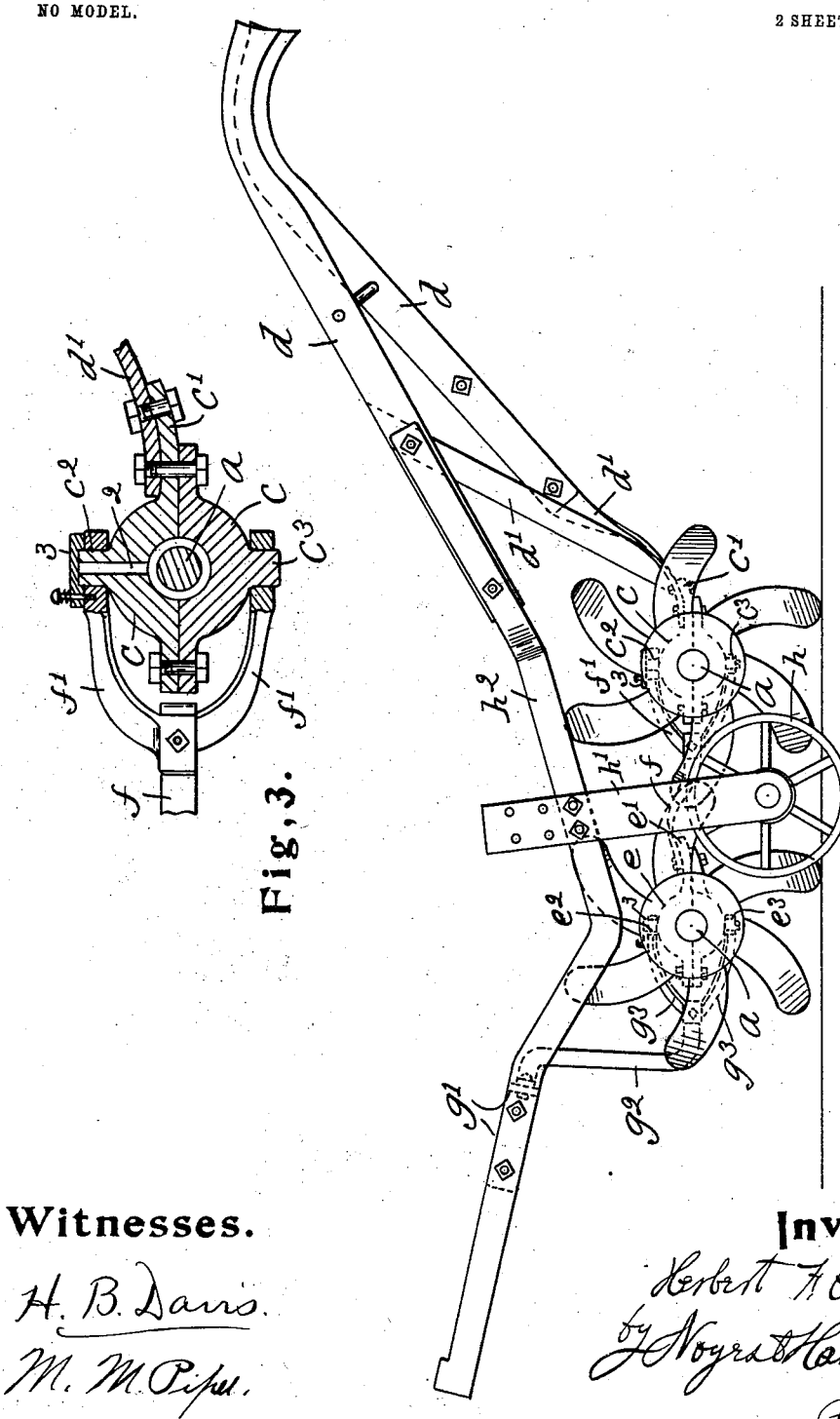

Patented December 22, 1903.

UNITED STATES PATENT OFFICE.

HERBERT F. ALLEN, OF ARLINGTON, MASSACHUSETTS.

HARROW.

SPECIFICATION forming part of Letters Patent No. 747,573, dated December 22, 1903.

Application filed September 11, 1903. Serial No. 172,709. (No model.)

*To all whom it may concern:*

Be it known that I, HERBERT F. ALLEN, of Arlington, county of Middlesex, State of Massachusetts, have invented an Improvement in Harrows, of which the following description, in connection with the accompanying drawings, is a specification, like characters on the drawings representing like parts.

This invention relates to harrows, and has for its object to construct a simple apparatus especially adapted for the use of truck-gardeners in breaking up the soil after the soil has been plowed, the apparatus being very effective in performing this work.

The apparatus comprises, essentially, a set of rotating cutters, each cutter having a plurality of radial cutting-blades, a frame supporting said cutters, a guide-roll at one side of the set of cutters adapted to follow in the furrows made by the plow, a draft connection at the forward end of the cutter-carrying frame, and a pair of handles at the rear end of said frame, both projecting obliquely toward one side of the set of cutters, so that the guide-roll will be properly disposed between the draft connection and handles to thereby enable the horse and man to travel on the land side, while the guide-roll runs in the furrow.

Figure 1 shows in plan view a cultivator embodying this invention. Fig. 2 is a side elevation of the cultivator shown in Fig. 1. Fig. 3 is a sectional detail of a part of the framework to be referred to.

$a$ represents one of the horizontal cutter-carrying bars, and $b$ one of the cutters mounted to rotate freely on said bar. As herein shown, two horizontal bars are provided, which are arranged in parallelism, and on each bar several rotatable cutters are mounted. Each cutter has a plurality of radial cutting-blades. The cutters on the front bar are located opposite the spaces between the cutters on the rear part.

The cutters are held in their proper relative positions on the bars by sleeves $b'$, which are placed between them. Upon the rear bar $a$, near each end thereof, a two-part box $c$ is placed, which forms a part of the frame, each box $c$ having a rearwardly-projecting ear $c'$, an upwardly-projecting boss $c^2$, and a downwardly-projecting boss $c^3$.

To the ears $c'$ of the box the handles $d$ are secured by means of straps $d'$, and said handles project rearwardly in an oblique direction toward one side of the set of cutters. Upon the front bar $a$, near each end thereof, two like boxes $e$ are mounted, which form a part of the frame, each box having a rearwardly-projecting ear $e'$, an upwardly-projecting boss $e^2$, and a downwardly-projecting boss $e^3$. A strap $f$ is attached to the ear $e'$ of each box $e$, which extends rearwardly and is attached to a yoke $f'$, one arm of which has a hole through it which receives a boss $c^2$ on the box and the other arm of which has a hole through it which receives a boss $c^3$ on said box. The front cutter-carrying bar is thus rigidly connected with the rear cutter-carrying bar.

A strap $g$ is attached to the frame $g'$ of the draft connection at one end thereof, and another like strap $g^2$ is attached to said frame at a point between its ends, and said straps $g$ $g^2$ extend rearwardly and are connected to yokes $g^3$, the upper arm of each yoke having a hole through it which receives the boss $e^2$ on the box $e$ and the lower arm of each yoke having a hole through it which receives the boss $e^3$ on the box $e$, thereby connecting the draft connection to the front of the cutter-carrying frame.

The frame of the draft connection extends forward in an oblique direction toward one side of the set of cutters, so that the pull on the draft connection comes opposite the handles with the cutters a little at one side instead of directly between them.

A guide-roll $h$ is journaled to the lower end of a bar $h'$, bolted to a bar $h^2$, the rear end of which is attached to a forward extension on one of the handles, and the front end of which extends forward and forms a part of the draft-frame $g'$. The guide-roll is supported by said bar $h^2$ at one side of the set of cutters, between the draft connection and handles, and is adapted to run in the furrow and guide the apparatus as the cutters operate to break up the soil.

Each box has an oil-hole, as 2, through the upper boss, which is closed by a small plate 3, loosely connected to the upper arm of each yoke. If flexibility of the apparatus is desired, the bolts connecting the several parts of the frame may loosely instead of rigidly connect said parts together.

Having thus described my invention, what I claim as new, and desire to secure by Letters Patent, is—

1. In a harrow, a set of cutters, each cutter having a plurality of radial cutting-blades, a frame supporting said cutters, a guide-roll at one side of said set of cutters adapted to follow in the furrow, a draft connection at the forward end of the frame which projects from the frame in an oblique direction toward one side of the set of cutters, and a pair of handles at the rear end of said frame, which likewise project from the frame in a direction obliquely toward one side of the set of cutters, substantially as described.

2. In a harrow, one or more horizontal cutter-carrying bars, rotatable cutters mounted thereon having radial cutting-blades, a frame supporting said bars having hand-levers at one end which project in an oblique direction toward one end of the bar, and a draft connection at the opposite end of said frame which likewise projects in an oblique direction toward the same end of the bar, and a guide-roll located adjacent to one end of said bar, between the draft connection and the handles, substantially as described.

3. In a harrow, one or more cutter-carrying bars, cutters rotatably mounted thereon having radial cutting-blades, a box at each end of each bar, each box having a rearwardly-extending ear, an upwardly-projecting boss, and a downwardly-projecting boss, handles connected to the ears of the boxes on the rear bar, a draft connection connected to the bosses on the boxes of the front bar, an intermediate connection between the boxes of the front and rear bars, and a side bar connecting the frame of the draft connection with one of the handles, which extends along at one side of the set of cutters, and a guide-roll journaled to a support depending from said side bar, substantially as described.

In testimony whereof I have signed my name to this specification in the presence of two subscribing witnesses.

HERBERT F. ALLEN.

Witnesses:
   B. J. NOYES,
   H. B. DAVIS.